(12) United States Patent
Stout, II et al.

(10) Patent No.: US 12,522,046 B2
(45) Date of Patent: Jan. 13, 2026

(54) METHOD AND SYSTEM FOR CONTROLLING A VEHICLE CLIMATE CONTROL SYSTEM BASED ON THERMAL CHARACTERISTICS OF AN OCCUPANT

(71) Applicant: FCA US LLC, Auburn Hills, MI (US)

(72) Inventors: Mark E Stout, II, Auburn Hills, MI (US); Travis Bechtel, Goodrich, MI (US)

(73) Assignee: FCA US LLC, Auburn Hills, MI (US)

( * ) Notice: Subject to any disclaimer, the term of this patent is extended or adjusted under 35 U.S.C. 154(b) by 280 days.

(21) Appl. No.: 18/341,303

(22) Filed: Jun. 26, 2023

(65) Prior Publication Data

US 2024/0424862 A1 Dec. 26, 2024

(51) Int. Cl.
*H04N 23/20* (2023.01)
*B60H 1/00* (2006.01)

(52) U.S. Cl.
CPC ............................. *B60H 1/00742* (2013.01)

(58) Field of Classification Search
CPC . B60H 1/00742; B60H 1/00357; H04N 23/20
USPC ........................................................ 701/36
See application file for complete search history.

(56) References Cited

U.S. PATENT DOCUMENTS

| | | | |
|---|---|---|---|
| 6,888,120 B2 | 5/2005 | Chiasson et al. | |
| 8,494,227 B2 * | 7/2013 | Prokoski | G06T 7/0012 382/270 |
| 9,517,679 B2 * | 12/2016 | Frank | B60R 21/0154 |
| 9,862,247 B2 * | 1/2018 | Perkins | B60H 1/00871 |
| 10,279,650 B2 * | 5/2019 | Maranville | B60H 1/00971 |
| 10,369,865 B2 * | 8/2019 | Perkins | B60H 1/00871 |
| 10,775,064 B1 * | 9/2020 | Vega | F24F 11/58 |
| 10,821,805 B2 | 11/2020 | Gallagher | |
| 11,014,424 B2 * | 5/2021 | Schumacher | B60H 1/00892 |
| 11,235,638 B2 * | 2/2022 | Neveu | G06V 10/143 |
| 11,254,185 B2 | 2/2022 | Shibuya et al. | |
| 11,472,258 B2 * | 10/2022 | Han | B60H 1/00742 |
| 11,498,500 B1 | 11/2022 | Pertsel et al. | |
| 11,511,598 B2 | 11/2022 | Maeng et al. | |
| 11,718,147 B2 * | 8/2023 | Schumacher | B60N 2/268 165/204 |
| 11,801,730 B1 * | 10/2023 | Vader | B60H 1/00357 |

(Continued)

FOREIGN PATENT DOCUMENTS

| | | |
|---|---|---|
| CN | 106394173 A | 2/2017 |
| EP | 4169753 A1 | 4/2023 |
| KR | 2019-0112681 A | 10/2019 |

OTHER PUBLICATIONS

Jeong-Hoon Lee et al., Estimating Clothing Thermal Insulation Using an Infrared Camera, 2016, MDPI, pp. 1-17.*

(Continued)

*Primary Examiner* — Manglesh M Patel
(74) *Attorney, Agent, or Firm* — Jeremy J. Klobucar

(57) ABSTRACT

A method of operating a climate control system includes determining a thermal characteristic for an occupant of a vehicle based on thermal images from a thermal image device within the vehicle. Determining a thermal characteristic includes determining a clothing condition signal, determining an occupant entry condition signal, determining a heat loss area signal and controlling a climate control system based of the thermal characteristic.

19 Claims, 4 Drawing Sheets

(56) References Cited

U.S. PATENT DOCUMENTS

| | | |
|---|---|---|
| 2005/0103876 A1 | 5/2005 | Martinez |
| 2008/0306656 A1 | 12/2008 | Baumann et al. |
| 2012/0312520 A1* | 12/2012 | Hoke .................. B60N 2/5628 219/217 |
| 2013/0314536 A1* | 11/2013 | Frank ..................... G06V 40/10 348/148 |
| 2015/0025738 A1* | 1/2015 | Tumas ............... B60H 1/00742 701/36 |
| 2015/0094914 A1* | 4/2015 | Abreu ............... B60H 1/00742 701/1 |
| 2016/0207541 A1 | 7/2016 | Mansur et al. |
| 2017/0088098 A1* | 3/2017 | Frank ..................... G06V 10/40 |
| 2017/0268793 A1* | 9/2017 | Cardonha ................ F24F 11/62 |
| 2018/0072133 A1* | 3/2018 | Yamanaka ............... F24F 11/89 |
| 2018/0141408 A1* | 5/2018 | Filipkowski ....... B60H 1/00735 |
| 2018/0222414 A1* | 8/2018 | Ihlenburg ........... B60H 1/00357 |
| 2019/0275860 A1* | 9/2019 | Migneco ........... B60H 1/00742 |
| 2020/0143180 A1* | 5/2020 | Burzo ..................... G06N 20/00 |
| 2020/0189353 A1* | 6/2020 | Shibuya .............. B60H 1/00742 |
| 2020/0369115 A1 | 11/2020 | Woodward et al. |
| 2021/0276393 A1 | 9/2021 | Schumacher et al. |
| 2022/0005210 A1* | 1/2022 | Raveendran ....... B60H 1/00742 |
| 2024/0190206 A1 | 6/2024 | Turcot |

OTHER PUBLICATIONS

Diana Schif et al., Sweat Detection with Thermal Imaging for Automated Climate Control and Individual Thermal Comfort in Vehicles , 2020, Scitepress, pp. 425-431.*

Junmeng Lyu et al., Where should the thermal image sensor of a smart A/C look ?—Occupant thermal sensation model based on thermal imaging data, 2023, Elsevier, pp. 1-15.*

U.S. Appl. No. 18/341,327, filed Jun. 26, 2023, Travis Bechtel, et al.

* cited by examiner

METHOD AND SYSTEM FOR CONTROLLING A VEHICLE CLIMATE CONTROL SYSTEM BASED ON THERMAL CHARACTERISTICS OF AN OCCUPANT

FIELD

The present disclosure relates to a system of detecting a thermal state of an occupant of a vehicle and, more specifically, to a method for adjusting the climate control system based upon the detection of the occupant thermal state.

BACKGROUND

This section provides background information related to the present disclosure which is not necessarily prior art.

Climate control system in vehicles require input for controlling the conditions in the occupant area. Vehicles may have climate control systems for one or more passengers. That is, the climate control system may have individual controls for controlling the driver front seat, the passenger front seat and one or more rear seats. Climate control settings include the temperature and, airflow or fan speed desired by the occupant. The vents through which the conditioned air travels may also be directed at or away from the occupant or the different parts of the vehicle.

In many vehicles, the climate control system has settings that are automatically adjusted. The occupant merely sets the desired temperature, and the fan speed is controlled automatically to achieve the desired temperature in the least amount of time. Such systems do not account for variations in the amount of heat and other occupant conditions.

Providing automatic adjustments to the thermal state of an occupant would reduce the driver distract and increase the comfort of the driver based on various conditions.

Infrared (IR) sensors have been used to detect various conditions in automotive vehicles. One example is the detection of the presence of a human within the passenger compartment. An alert may be sent to the passenger to prevent, for example, a child from being left in a hot vehicle. Infrared sensors have also been used to detect the thermal pattern of an occupant's face and control the climate control system based thereon. One problem with such a system is that other factors affect the comfort of the occupants of the vehicle.

SUMMARY

This section provides a general summary of the disclosure and is not a comprehensive disclosure of its full scope or all of its features.

The present disclosure uses thermal imaging to provide further control of the climate control system based upon various sensed factors including the clothing of an occupant, the entry condition of the occupant and the conditions of exposed areas.

In one aspect of the disclosure, a method of operating a climate control system includes determining a thermal characteristic for an occupant of a vehicle based on thermal images from a thermal image device within the vehicle. Determining a thermal characteristic includes determining a clothing condition signal, determining an occupant entry condition signal, determining a heat loss area signal and controlling a climate control system based of the thermal characteristic.

In another aspect of the disclosure, a system for controlling a climate control system includes a thermal image device and a controller programmed to determine a thermal characteristic for an occupant of a vehicle based on thermal images from the thermal image device by being programmed to determine a clothing condition signal, determine an occupant entry condition signal, and determine a heat loss area signal. The controller is programmed to control the climate control system based of the thermal characteristic.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
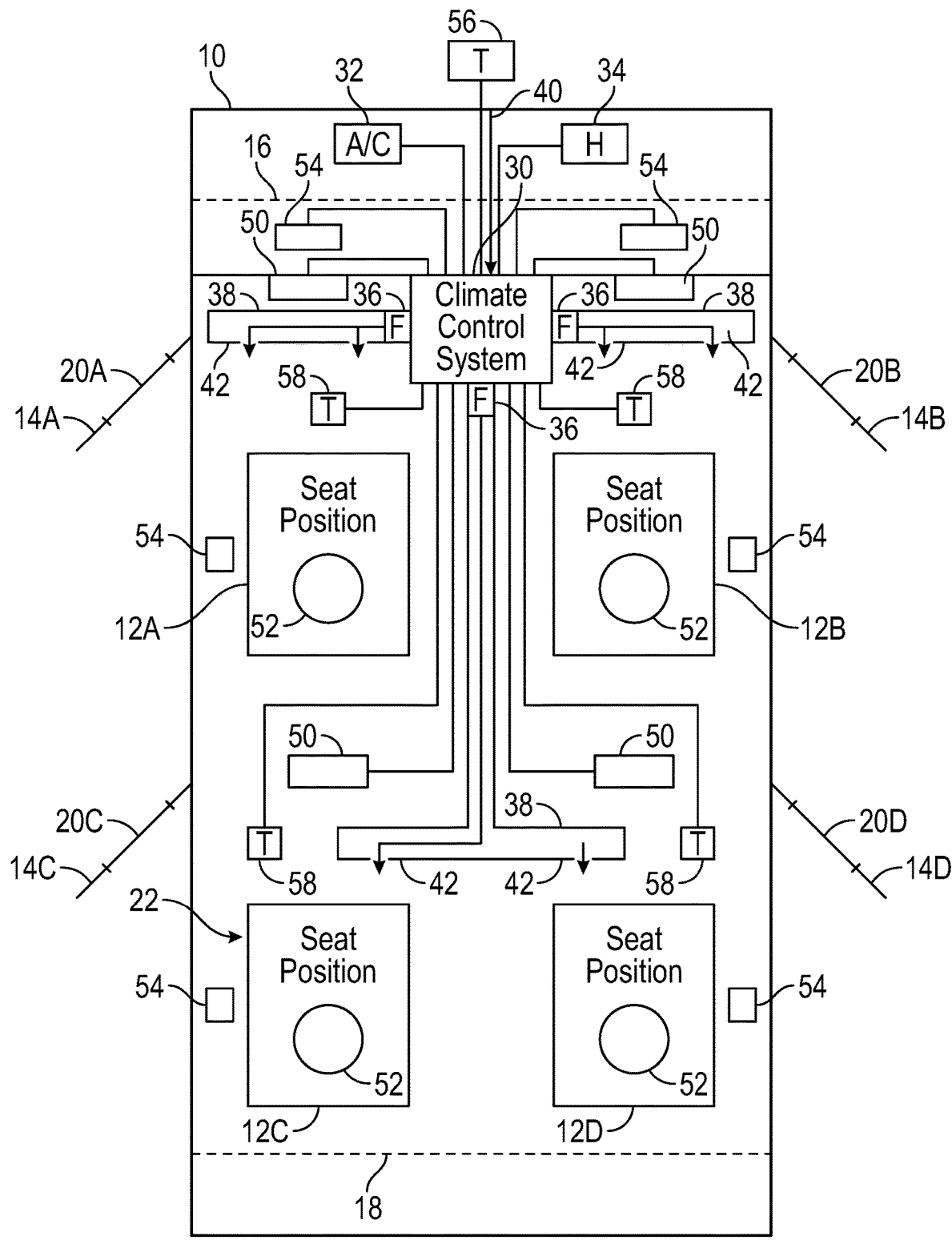
FIG. 1A is a block diagrammatic representation of a vehicle having a climate control system.

Referring now to FIG. 1A, a vehicle 10 is illustrated having a plurality of seating positions 12A, 12B, 12C and 12D. Seating position 12A, in this example, is the driver position. The seating position 12B is the front passenger position. Seat position 12C is the rear left passenger position and seat position 12D is in the rear right passenger position. The vehicle 10 has a plurality of doors 14A, 14B, 14C and 14D adjacent to each of the seat positions 12A-12D. Of course, more seat positions such as a position between seat positions 12A and 12B, between 12C and 12D and behind 12C and 12D may also be provided in a vehicle. The teachings set forth herein apply equally to the seating positions 12A-12D illustrated and seating positions not illustrated.

The vehicle 10 also has a windshield 16, a rear window 18 and door windows 20A-20D that correspond to the doors 14A-14D, respectively. The amount of solar load from sunshine entering the passenger compartment 22 varies considerably based upon the position and angle of the sun relative to the vehicle. Of course, other windows including a sunroof may be included within the vehicle.

A climate control system 30 is also included within the vehicle. The climate control system 30 is in communication with an air conditioning system 32 and a heater system 34 to control the outlet temperature of the vents. The air conditioning system 32 may comprise an air conditioning compressor coupled to the engine by way of a belt. The air conditioning system 32, in an electric vehicle, may be an electric motor that operates a compressor to generate cooling fluid.

The heater system 34 may be coupled to an engine to remove heat from the engine and provide it to the passenger compartment 22. The heater system 34 may also be a resistive heater or combinations of a resistive heater and an engine heater. One or more fans 36 are used to move air from the air conditioning system 32, the heater system 34 and possibly from air from outside the vehicle as well. The air from the outside of the vehicle is indicated by the arrow 40. The fans 36 communicate air through the ducts 38. Each individual position may have its own duct or, for example, the seat positions 12C and 12D in the rear of the vehicle may spare a common duct. Various possibilities are available for different vehicles.

The ducts 28 have vents 42 through which controller air is communicated to the passenger compartment 22. Two vents 42 are illustrated directed to the seat positions 12A and 12B. One vent is directed at the seating positions 12C and 12D. However, various numbers of vents in various positions may be provided such as at the legs, at various positions of the torso, the arms and the like. The direction of the vents may be controlled laterally longitudinally, and vertically. Inputs to the climate control system 30 include thermal image devices such as thermal cameras 50 that are positioned to view the seating positions 12A-12D. The thermal cameras 50 generate thermal camera signals corresponding to a thermal image of the seating positions 12A-12D. That is, the thermal cameras 50 generate thermal images of the occupants 52 and various aspects of the occupants 52 as will be described in further detail below. The thermal cameras 50 generate thermal image signals that are communicated to the climate control system 30 and are processed by a microprocessor therein. Various filtering, analysis and machine learned or neural network outputs are used to control the various aspects of the climate control system including the air conditioning 32, the heater system 34, the fans 36 and the like.

The climate control system 30 also is coupled to sun load sensors 54. The sun load sensors 54 generate a sun load signal corresponding to the sun load at the position at which the sun load sensors 54 are mounted. Other sun load sensors 54 are not connected to the climate control system as illustrated in FIG. 1A. Those in the art will understand that they are actually coupled to the climate control system 30 but for simplicity of illustration purposes are not illustrated as such. The sun load sensors 54 may be positioned in front of the first and second seating positions 12A, 12B, on the sides of the seating positions 12A, 12B. in addition, sun load sensors 54 may be located in other systems such as on the outside of seating positions 12C, 12D.

An external temperature sensor 56 may generate a temperature signal corresponding to the exterior temperature of the vehicle and communicate the exterior temperature signal to the climate control system 30.

Although one thermal camera 50 is shown for each seat position 12A-12D, multiple cameras 50 in multiple positions may be used.

Cabin temperature sensors 58 may be located at various positions throughout the passenger compartment 22. The temperature sensors 58 generate a temperature signal adjacent to the seating positions 12A-12D.

Figure 1B:
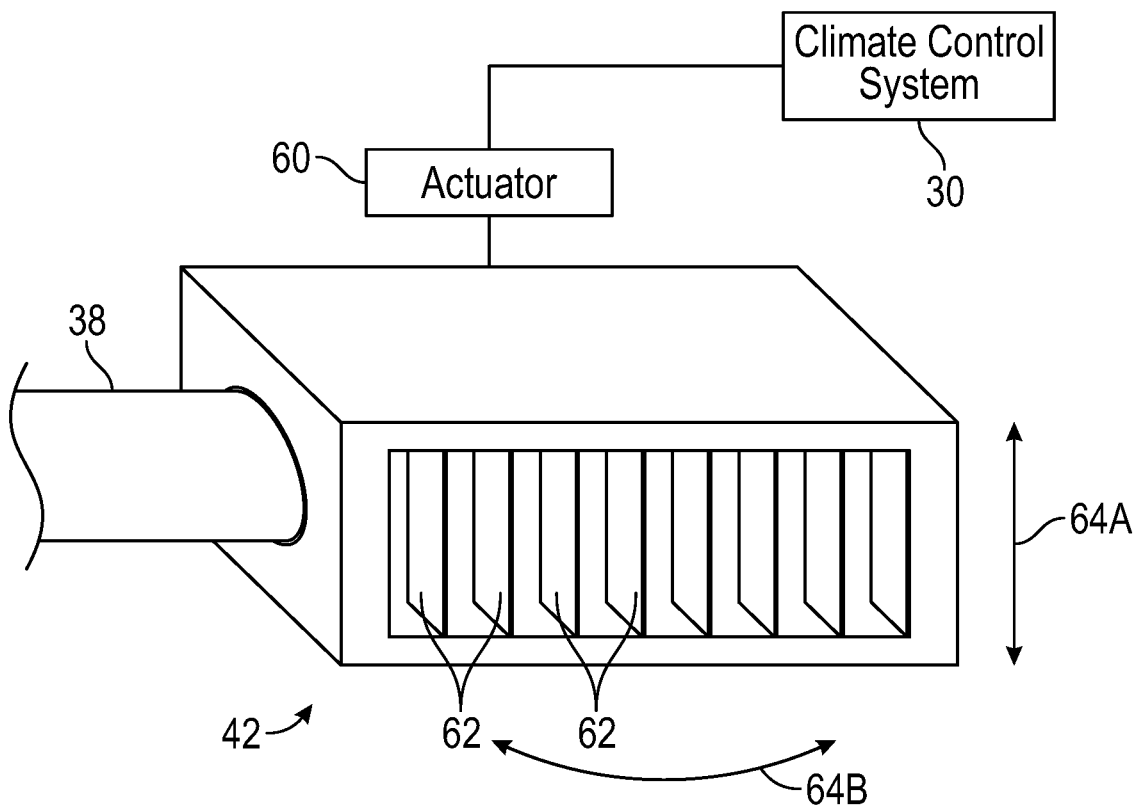
FIG. 1B is a perspective view of one example of a vent in an open position.
Figure 1C:
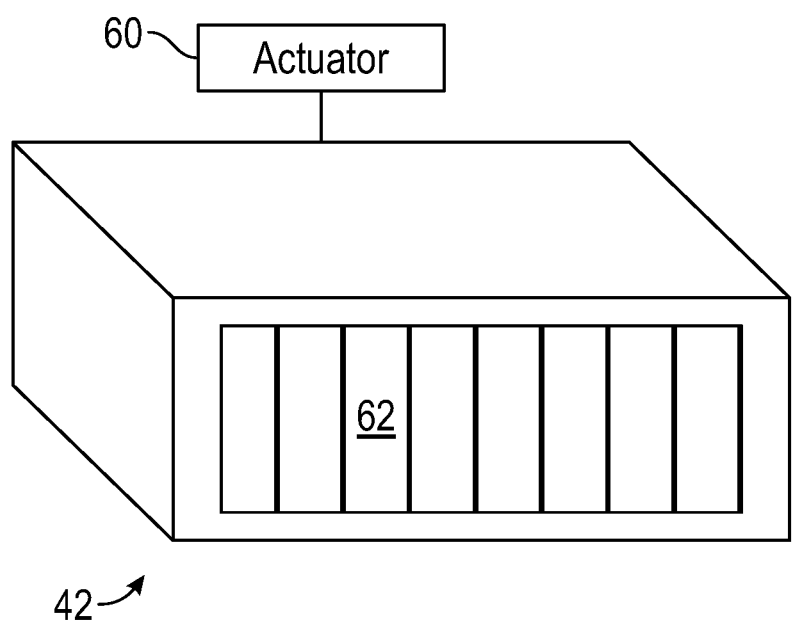
FIG. 1C is a perspective view of a vent in a closed position.

Referring now to FIGS. 1B and 1C, the vents 42 illustrated in FIG. 1A are merely represented by openings. The vents 42 may be coupled to a vent actuator 60. The vent actuator 60 is in communication with the climate control system 30. The climate control system 30 may control the actuator 60 to move the vents 42 in desired positions. That is, the vents 42 may have louvers 62 that are movable in an upward and downward position as well as in a rightward or leftward direction as illustrated by arrows 64A, 64B, respectively. That is, the actuator 60 may move the louvers 62 into various positions including a closed position as illustrated in FIG. 1C. By opening and closing the louvers 62, directing the louvers 62, controlling the fan speed, controlling the air temperature within the ducts 38, occupant comfort can be controlled precisely. Of course, multiple actuators 60 and multiple vents 42 may be located at various positions around the occupants 52.

Figure 2:
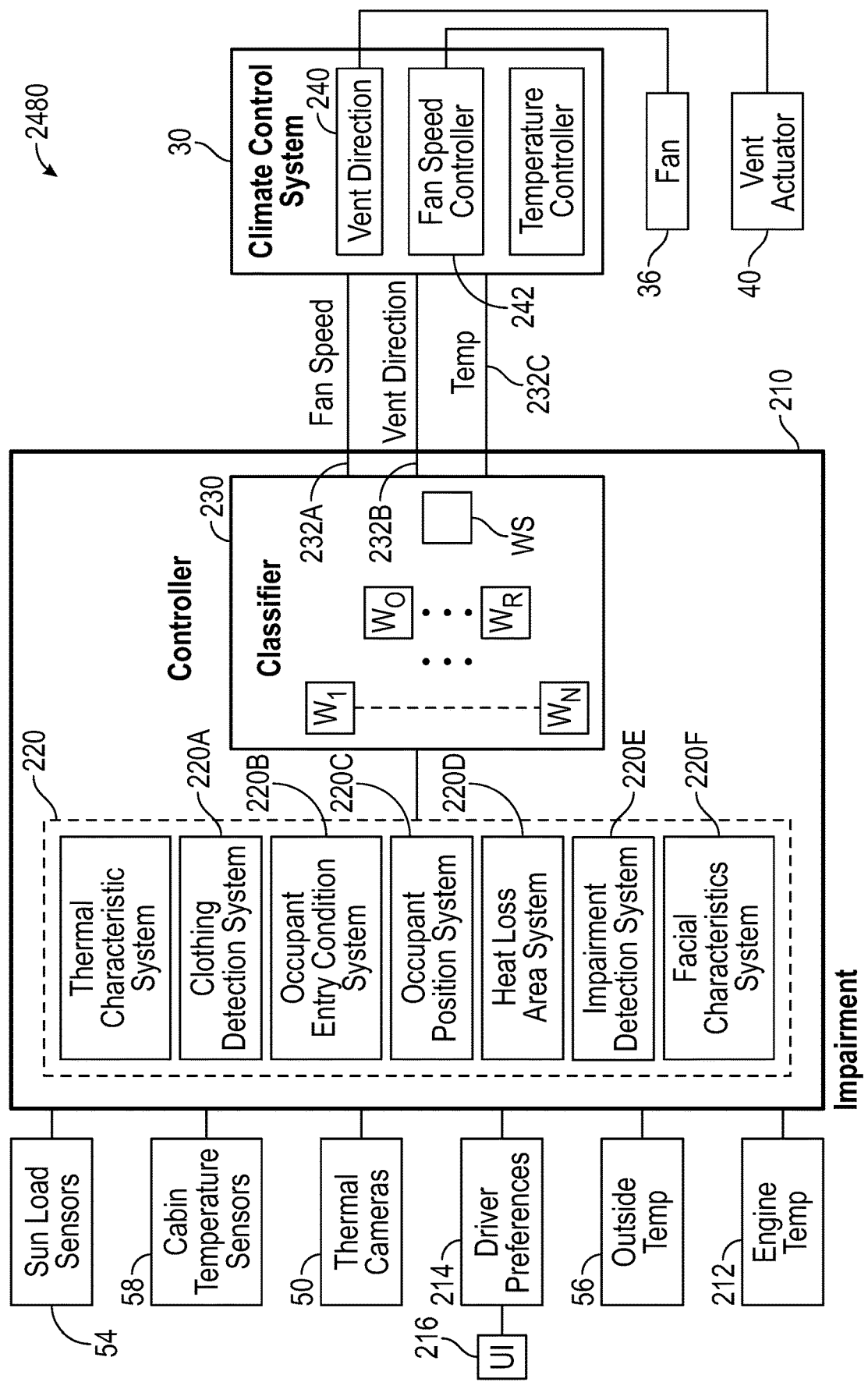
FIG. 2 is a detailed block diagrammatic view of a climate control system.

Referring now to FIG. 2, the various sensors are illustrated coupled to a controller 210. The controller 210 is programmed to perform various determinations and generate various intermediate signals used to ultimately control the climate control system. The sensors include the sun load sensors 54, the cabin temperature sensors 58, the thermal cameras 50 and other sensors including an engine temperature sensor 212. The engine temperature sensor 212 may be provided in internal combustion engine systems. However, the engine temperature sensor 212 may be eliminated in electric vehicles. Driver preferences 214 may be controlled by a user interface 216. For example, driver preferences 214 may include the desired temperature of the vehicle. Driver preferences 214 may be controlled through the user interface 216 which may be touch screen, dials, buttons or the like. The driver preferences 214 may include, but are not limited to, the desired position or amount of blowing of the vent air to the facial region of an occupant, the temperature of the occupant, a temperature differential for the occupant, such as but not limited to warmer at the feet and cooler at the face. Ultimately, the signals from the sensors 54-58 and the driver preferences 214 and engine temperature 212 are provided to the controller 210. Ultimately, various thermal characteristics for the occupants 52 of the vehicle may be determined. The thermal characteristics together with the sun load sensor signals, the cabin temperature sensor signals, the driver preferences, the outside temperature signals and the engine temperature signals may be used to ultimately control the climate control system.

The controller 210 has various systems therein that are used for determining the thermal characteristics for the occupant. The systems may include a clothing detection system 220A, an occupant entry condition system 220B, an occupant position system 220C, a heat loss area system 220D, an impairment detection system 220E and a facial characteristic system 220F. Each of the sensors 220A-220F are provided in a thermal characteristic system 220.

All of the systems within the thermal characteristic system may be an individual machine learning or neural network. The outputs of all of the systems of the thermal characteristic system 220 are provided to a classifier 230 such as a neural network or machine learning system which generates outputs to control the climate control system 30. Of course, the climate control system may include the controller 210 and the classifier 230 The classifier 230 may generate various signals for controlling the climate control system 30. A fan speed signal 232A, a vent direction signal 232B and a temperature signal 232C may be provided to the climate control system 30 which controls the actuator 60, the speed of the fans 36 and the temperature. Ultimately, the climate control system 30 has a vent direction and movement pattern controller 240 and a fan speed controller 242 that control the fan 36 and the vent actuator 60 based upon the signals 232A-232C.

As mentioned above, the individual systems within the thermal characteristic system 220 and the classifier 230 may be a machined learning system or multilayer neural networks that are trained to provide the desired signals 232A-232C.

The clothing detection system 220A may determine a clothing condition signal that is provided to the classifier 230. The clothing detection system 220A based upon the thermal image signals from the thermal cameras 50 may be used to determine the conditions of the clothing and the type of clothing worn by the occupants. By training a machine learning system or a neural network, it was found that the clothing condition may be determined. For example, the presence of a collar or no collar, a coat being zipped or unzipped, the number of layers of clothing may be determined, the presence of short sleeves or long sleeves. Ultimately, the conditions of the torso, such as the torso cover, may be determined. An arm covering signal may also be determined. An arm covering signal may determine long sleeve, short sleeves and the like. A leg covering signal may determine whether the occupant is wearing a dress, skirt or shorts. The type of layers may also be determined. A single layer can be determined as a light layer. A medium layer, such as light fleece or flannel, may also be distinguished. A heavy layer such as a medium layer plus a shell may be determined as a heavy layer. A very heavy layer may be identified by the occupant wearing a winter coat. With respect to the arm covering, short sleeves, long sleeves, double layers may all be distinguished. The occupant may also be wearing gloves, no gloves or heavy winter gloves.

The torso layers may be determined as a zipped up layer, a mid-zipped or an unzipped condition relative to a coat or a lighter layer.

The covering of the legs, such as slacks which are a light layer, jeans which are a medium layer and jeans and long johns or snow pants may be determined as a heavy layer.

Other type of clothing coverings may include a hat or no hat, whether the hat covers the ears or the ears are exposed. Each of these different conditions corresponds to a signal that may be provided to the classifier 230.

The occupant entry condition system 220B generates an occupant entry condition signal. The occupant entry condition system 220B may generate a cold soak signal corresponding to the upper body and head being in a cold thermal state. A flush condition, a warmer or colder than expected entry condition (a different than expected entry condition signal) may also be provided. The warmer or colder than expected entry condition may take into consideration the outside temperature 56. Although the outside temperature 56 may be cold, the occupant may be warm because they recently left a sheltered place, such as the home or office. Each of the different characteristics may be included within a data signal such as an occupant entry data signal that is generated by the occupant entry condition system 220B. The data within the occupant entry data signal may include a hot signal that corresponds to warm or extra warm person or occupant such as someone who has rushed or run to enter the vehicle. The occupant may also be at the room temperature and thus room temperature data may be provided. A cool temperature data may also be provided for a person who walked a small distance to the vehicle in cold weather. This may correspond to a person walking a distance at a store to enter the vehicle in a cold climate. A cold condition of a person may correspond to a person walking a significant difference to enter the vehicle and thus the clothing and the person cool down significantly.

The occupant position system 220C generates an occupant position signal that has various data associated therewith. The occupant position signal corresponds to data of the position of the occupant relative to the passenger compartment 22.

The occupant position system 220C may determine an occupant location within the cabin, a seating bias, a learning bias, a reclining bias, a hunching bias and an over the wheel position. The occupant position system uses the thermal signals from the thermal cameras to determine the occupant position data. The head position, the torso position, the arm and hand position and the leg position may all be determine. Whether the legs are splayed or together may also be determined. The position of the arms and hands may be different for each of the arms. For example, a driver may have a left arm positioned on the door while the right arm may be positioned with a right hand holding the steering wheel, both positions have the arms away from the body versus together at the body. There is high value in directing airflow to the hands and then the arms. Such air also directed toward the core as well. This is useful, particularly during initial warming of the cabin. The vents may direct air such as warming air in a direction encompassing the hands, arm and torso core based on the occupant hand/arm/torso position.

A heat loss area system 220D may also be used to determine areas of heat loss on the occupant. The nose may be below the facial temperature. Likewise, ears may be determined as exposed or not exposed. Exposed ears may have a lower temperature than the rest of the head. Ears that are now exposed may be covered with a hat or hair. The amount of hair may also be determined so a hair covering signal is generated. The hair covering signal may indicate if a forehead is covered with hair, ears are covered with hair or neck is covered with hair. Conditions such as no hair, short hair and the length of hair may all be factors in a hair length signal determining the thermal characteristics of the occupant. Another heat loss area is around the eyes of the occupant. The detection of glasses or no glasses may also be also determined from the thermal camera signals. Another heat loss area is exposed arms or legs resulting in an exposed limb signal. Further an exposed hand signal may be generated when the occupant's hands are exposed.

The presence or absence of facial hair may also affect the thermal characteristics of a person and thus may be recognized in the heat loss area system 220D.

The impairment detection system 220E may generate an impairment signal corresponding to characteristics of an impairment of an occupant. The impairment of an occupant is a thermal characteristic of an occupant. The impairment detection system 220E generates data corresponding to the impairment. From the thermal cameras 50, alcohol flush, a fever, clammy and respiration rate may be determined. The respiration rate, for example, may be determined by taking multiple images from the thermal cameras over time. The respiration rate may be calculated by looking at the rate of change of temperature at the nasal cavity (hottest-coldest-hottest temp corresponds to one breath cycle).

A facial characteristic system 220F may also be included within the controller 210 and the thermal characteristic system 220. The facial characteristic system 220F generates a facial characteristic system 220F that may support anti-spoofing. The facial characteristic system may use the thermal images to identify non-personally identifiable information such as face printing. The facial characteristic system 220F may be used for starting a vehicle or recognizing an occupant so that driver preferences 214 are automatically applied. The facial characteristic system 220F may obtain images from the thermal cameras 50 to identify an occupant and automatically set the preferences for the particular occupant.

The clothing detection signal, the occupant entry condition signal, the occupant position signal, the heat loss area signal, the impairment detection signal and the facial characteristic signal are provided to the neural network together with the other sensors such as the sun load sensor, the cabin temperature sensor signal, the outside temperature signal and the engine temperature signal so that the occupant may be placed into the desired thermal condition using the climate control system 30. The neural network uses a plurality of weights in multiple layers. Three layers are illustrated in the classifier 230. However, multiple layers may be provided. The neural network, in this example, has layers that have weights W1-WN, WO-WR and WS to provide the final signals such as the fan speed signal 232A, the vent direction 232B and the temperature signal 232C.

Figure 3:
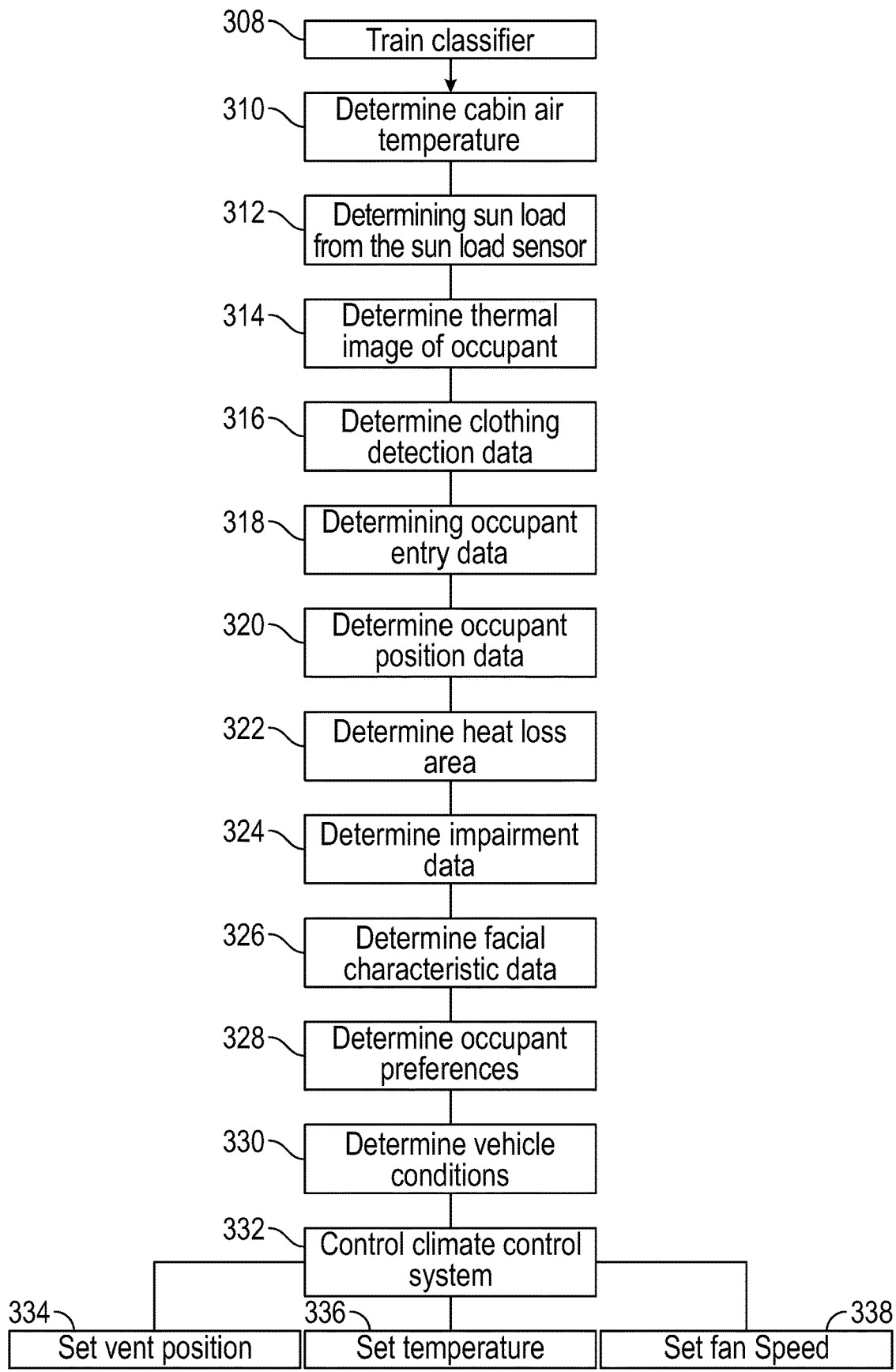
FIG. 3 is a flowchart of a method for operating the climate control system.

Referring now to FIG. 3, a method for controlling a climate control system is a vehicle is set forth. In step 308, the classifier is trained with a plurality of images. Training a neural network is well known. A classifier such as the neural network is trained with known images until the output identifies a certain percentage of correct identities. All of the systems within the thermal characteristic system 220 has thermal images associates therewith. The neural network or machine learning systems within the thermal characteristics are thus trained. Likewise, the neural network for determining the proper settings for the climate control system are likewise trained.

In step 308, a cabin air temperature is determined from the data within the cabin air signal from the cabin air temperature. As mentioned above, the cabin air temperature may be a localized cabin air temperature proximate the occupant for which the controller settings are determined.

In step 312, a sun load from the sun load sensor or sensors is determined. Again the sun load may be determined at a limited number of positions in the vehicle. For example, only one sun load sensor may be provided. However, a plurality of sun load sensors such as sensors proximate the occupant in question may be determined. Determining the sun load from the sun load signal from the sun load sensor or sensors may provide an indication of uneven solar load. For example, if the sun load sensor is located just inside a window, the window side of the occupant may be warmer than the portion of the occupant further away from the sun load. Thus, the vent on the outside side of the occupant may be cooled greater than the inside portion by directing the vent actuator accordingly.

In step 314, a thermal image or images of the occupant are determined. The thermal images may continually be obtained to determine whether changes have been made. For example, an occupant may unzip or remove one or more layers of clothing. The thermal images are provided to the thermal characteristic system 220. The thermal characteristic system is illustrated as a plurality of systems for determining various aspects within the thermal images as mentioned above. Not all of the systems within the thermal characteristic system 220 may be provided.

Referring now to step 316, the clothing detection system 220A determines clothing detection data. As mentioned above, the clothing detection data may provide an indication of a plurality of thermal conditions for the occupant.

In step 318, the occupant entry condition system 220B determines the occupant entry data for an occupant. The occupant entry data may include the various types of data described above and is therefore not repeated.

In step 320, the occupant position system 220C determines the occupant position data. The occupant position system determines the relative position of the occupant relative to the seating position and therefore the vents within the passenger compartment 22. As mentioned above arm position, hand position, torso position may all be relevant determinations.

The heat loss area system 220D determines the heat loss from the occupant. The various heat loss areas of the occupant may be occupied as determined above. The heat loss area system 220D generates a plurality of data that is ultimately provided to the classifier 230.

The impairment detection system 220E generates an impairment signal that provides a plurality of data corresponding to a plurality of impairments that may be determined. A plurality of impairments are described above relative to the impairment detection 220E in FIG. 2.

In step 326, the facial characteristic system 220F is used to determine facial characteristics. The facial characteristic data may include the identification of an occupant and therefore the occupant preferences may be determined in step 328. The facial characteristic system may also determine a plurality of facial characteristics as described above.

As mentioned above, step 328 may determine the occupant preferences based upon recognition of an occupant from the facial characteristics. The occupant preferences may also be set in the driver preferences 214 illustrated above. The driver preferences 214 may store preferences for various occupants of the vehicle.

In step 330, the vehicle conditions are determined. As mentioned, the vehicle conditions, such as the cabin temperature, the outside temperature and the engine or heating system temperature, may all be determined. In step 332, the vehicle conditions and the conditions determined in the thermal characteristic 220 and the subsystems therein may be used to control the climate control system. As mentioned above, not all of the subsystems 220A-220F may be provided in a system.

The climate control system settings are determined at the classifier 230 such as the machine learning system or neural network based upon the weights as trained in the system. The vent position of each vent may be set in step 334, the temperature settings may be set in step 336 and the fan speed may be set in step 338 based on the determinations identified above.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method comprising:
   determining a thermal characteristic for an occupant of a vehicle based on thermal images from a thermal image device within the vehicle,
   wherein determining a thermal characteristic comprises:
   determining a clothing condition signal by generating a torso covering signal, an arm covering signal, a leg covering signal, a head covering signal, a collar or no collar signal, and a coat zipped or unzipped signal;
   determining an occupant entry condition signal;
   determining a heat loss area signal;
   processing the clothing condition signal, the occupant entry condition signal and the heat loss area signal using a neural network to generate a control signal; and
   controlling one or more vent actuators of a climate control system to adjust airflow characteristics using the control signal generated by the neural network.

2. The method of claim 1 wherein determining the clothing condition signal comprises generating a number of clothing layers signal.

3. The method of claim 2 wherein generating the torso covering signal comprises generating a coat presence signal and a zipped/unzipped signal.

4. The method of claim 1 wherein generating an occupant entry signal comprises generating at least one of a cold soak signal, a flush signal, a different than expected entry condition signal.

5. The method of claim 1 wherein determining a heat loss area signal comprises at least one of a nose temperature signal, an ear temperature signal, an exposed limb signal.

6. The method of claim 5 wherein the exposed limb signal comprises an exposed hand or exposed arm signal.

7. The method of claim 1 wherein determining a heat loss area signal comprises determining a hair length signal.

8. The method of claim 1 wherein determining a heat loss area signal comprises determining a hair covering signal.

9. The method of claim 1 wherein determining the thermal characteristic comprises determining an occupant body position signal by determining at a head position signal and a torso position signal.

10. The method of claim 9 wherein determining the occupant position signal further comprises determining at least one of an occupant seating bias signal, an occupant leaning signal, an occupant reclining signal and an occupant hunching signal.

11. The method of claim 1 further comprising determining an impairment signal by determining an alcohol flush signal, a fever signal, a clammy signal and respiration rate signal and determining the thermal characteristic in response to the impairment signal.

12. The method of claim 1 wherein controlling the climate control system comprises controlling at least one of a fan speed, at least one of a lateral vent direction and a longitudinal vent direction and an outlet temperature of the climate control system.

13. The method of claim 1 further comprising determining driver preferences, and an outside temperature and controlling the climate control system based on the driver preferences and the outside temperature.

14. A system for controlling a climate control system comprising:
    a thermal image device;
    a controller programmed to determine a thermal characteristic for an occupant of a vehicle based on thermal images from the thermal image device by being programmed to determine a clothing condition signal, determine an occupant entry condition signal, determine a heat loss area signal, wherein the clothing condition signal is formed by generating a torso covering signal, an arm covering signal, a leg covering signal, a head covering signal, a collar or no collar signal, and a coat zipped or unzipped signal;
    a neural network processing the clothing condition signal, the occupant entry condition signal and the heat loss area signal to generate a control signal; and
    said controller programmed to control one or more vent actuators of the climate control system to adjust airflow characteristics using the control signal generated by the neural network.

15. The system of claim 14 wherein the controller is programmed to determine the clothing condition signal by being programmed to generate a number of clothing layers signal.

16. The system of claim 14 wherein the controller is programmed to determine the occupant entry signal by being programmed to generate at least one of a cold soak signal, a flush signal, and a different than expected entry condition signal.

17. The system of claim 14 wherein the controller is programmed to determine the heat loss area signal by being programmed to generate at least one of a nose temperature signal, an ear temperature signal, an exposed limb signal.

18. The system of claim 14 wherein the controller is programmed to determine the heat loss area signal by being programmed to generate a hair length signal.

19. The system of claim 14 wherein the controller is programmed to determine the heat loss area signal by being programmed to generate a hair covering signal.

* * * * *